United States Patent

Abe et al.

[11] Patent Number: 5,926,085
[45] Date of Patent: Jul. 20, 1999

[54] POSITION SENSOR WITH COMMUNICATION HOLE

[75] Inventors: Hideki Abe; Kunji Murano, both of Miyagi-ken; Yoshio Nuiya, Saitama-ken; Yoshifusa Kanazawa, Saitama-ken; Yasuo Takagi, Saitama-ken, all of Japan

[73] Assignees: Alps Electric Co., Ltd.; Honda Motor Co., Ltd., both of Tokyo, Japan

[21] Appl. No.: 08/815,522

[22] Filed: Feb. 27, 1997

[30] Foreign Application Priority Data

Feb. 28, 1996 [JP] Japan ................................. 8-041460

[51] Int. Cl.⁶ .................................................. H01C 10/30
[52] U.S. Cl. ............................................................ 338/160
[58] Field of Search ...................................... 338/164, 184, 338/197, 237, 323, 312, 172, 202; 313/500

[56] References Cited

U.S. PATENT DOCUMENTS

| | | | |
|---|---|---|---|
| 4,928,083 | 5/1990 | Sims et al. | 338/202 |
| 4,933,601 | 6/1990 | Sagawa et al. | 313/500 |
| 4,933,661 | 6/1990 | Oda et al. | 338/174 |
| 5,039,975 | 8/1991 | Ishihara et al. | 338/312 |
| 5,144,277 | 9/1992 | Ishihara et al. | 338/164 |

*Primary Examiner*—Teresa Walberg
*Assistant Examiner*—Jeffrey Pwu
*Attorney, Agent, or Firm*—Brinks Hofer Gilson & Lione

[57] ABSTRACT

According to the present invention there is provided a highly reliable position sensor capable of preventing the entry of foreign matters such as water and dust from the exterior into a receptacle chamber formed within a housing. Formed in the housing are a mounting opening to be mounted in a sealed state to a throttle body and a receptacle chamber having an opening. The receptacle chamber and the mounting opening are partitioned from each other by a partition wall. A sensor body is mounted into the receptacle chamber and the opening of the chamber is covered with a cover, then a clearance formed between the opening and the cover is filled and sealed with a thermosetting resin such as an epoxy resin. A communication hole for communication between the receptacle chamber and the mounting opening is formed through an operating shaft which is rotating a sliding-element receiver of the sensor body. While the thermosetting resin is heated, the air expanded in the receptacle chamber is allowed to escape through the communication hole to the exterior. After a throttle position sensor as the position sensor has been attached to the throttle body, the communication hole formed in the operating shaft is shut off from the exterior by the mounting surface for the throttle body.

8 Claims, 3 Drawing Sheets tion 8 in which is fitted a bearing 7. Outside the largediameter portion 8 is formed a recess 9. An end portion of the rotatable shaft 4 is projecting from the bottom of the recess 9, and the rotatable shaft 4 is supported rotatably by the bearing 7. In the throttle body 1 thus constructed, the opening/closing disc 5 in the operating portion 3 is opened or closed in proportion to the amount of operation of the accelerator pedal, whereby the amount of air to be fed to the engine through the interior of the cylindrical portion 2 is adjusted.

POSITION SENSOR WITH COMMUNICATION HOLE

BACKGROUND OF THE INVENTION

The present invention relates to a position sensor for detecting the position of an operating portion of a device body and more particularly to a position sensor suitable for use in an environment containing moisture and dust such as, a vehicular throttle position sensor.

Generally, a vehicle such as a gasoline-fueled vehicle is provided with a position sensor called a throttle position sensor for setting an optimal amount of fuel to be supplied according to a running speed of the vehicle and thereby allowing the vehicle to run in an optimal fuel consumption.

Heretofore, as an example of a throttle position sensor of this type, there has been known, as described in Japanese Utility Model Laid-Open No. Hei4-8401(1992), a position sensor in which a sensor body comprising a sliding-element receiver and a resistor substrate is mounted in the interior of a receptacle chamber formed in a housing, a cover is applied to an opening of the receptacle chamber, and a clearance between the receptacle chamber and the cover is sealed with a thermosetting resin. In such a known position sensor, a communication hole is formed for communication between the receptacle chamber and a connector portion which is integral with the housing, and at the time of heat-curing the thermoplastic resin for sealing, the air expanded within the receptacle chamber is allowed to escape through the communication hole to the exterior of the connector portion. In this way the rise of pressure in the receptacle chamber at the time of heat-curing the thermosetting resin is suppressed to thereby prevent the formation of pores or the like in the thermosetting resin.

According to the above prior art, since the insertion of an external connector into the connector portion is done after mounting of the position sensor to a device body of a vehicle or the like, the communication hole formed in the interior of the connector is kept dust- and waterproof against the exterior. However, no consideration is given to preventing the entry of dust and water in the interior of the housing.

SUMMARY OF THE INVENTION

The present invention has been accomplished in view of the above-mentioned circumstances of the prior art and it is an object of the invention to provide a highly reliable position sensor capable of surely preventing the entry of such foreign matters as water and dust into the receptacle chamber of the housing.

According to the present invention, a communication hole for communication between the receptacle chamber and a mounting opening is formed in an operating shaft. Dust and water are prevented from entering the communication hole when it is attached to a device body. When the opening of the receptacle chamber is sealed with a cover during assembly of the position sensor, the air present within the receptacle chamber and expanded by heating of the thermosetting resin located between the receptacle chamber opening and the cover is allowed to escape to the exterior of the housing through the communication hole formed in the operating shaft, whereby the formation of pores or the like in the thermosetting resin can be prevented. Further, when the position sensor after completion of its assembly is attached to a device body, the communication hole formed in the operating shaft is rendered dust- or waterproof, whereby the inside of the mounting opening is isolated from the outside. Consequently, even when the position sensor is disposed in an environment easily affected by a foreign matter such as dust or water, it is possible to surely prevent the foreign matter from entering the receptacle chamber through the communication hole.

More specifically, according to the present invention there is provided a position sensor including a housing having a mounting opening to be mounted to a device body through a partition wall and also having a receptacle chamber, an operating shaft supported rotatably by the partition wall, a sliding-element receiver connected to the operating shaft within the receptacle chamber, an insulating substrate disposed in close opposition to the sliding-element receiver within the receptacle chamber, and a cover for closing an opening of the receptacle chamber, the cover being sealed with a thermosetting resin. A communication hole for communication between the receptacle chamber and the mounting opening is formed in the operating shaft. When the position sensor is attached to the device body, the communication hole is rendered dust- or waterproof.

The communication hole has a constriction which constricts the section of the communication hole so that a foreign matter is difficult to enter the communication hole from the mounting opening side of the housing.

The mounting opening side of the communication hole provided with the constriction is formed smaller in diameter and is formed wider than a clearance adjacent thereto.

DETAILED DESCRIPTION OF PREFERRED EMBODIMENTS

Embodiments of the present invention will be described hereinunder with reference to the accompanying drawings.

Figure 1:
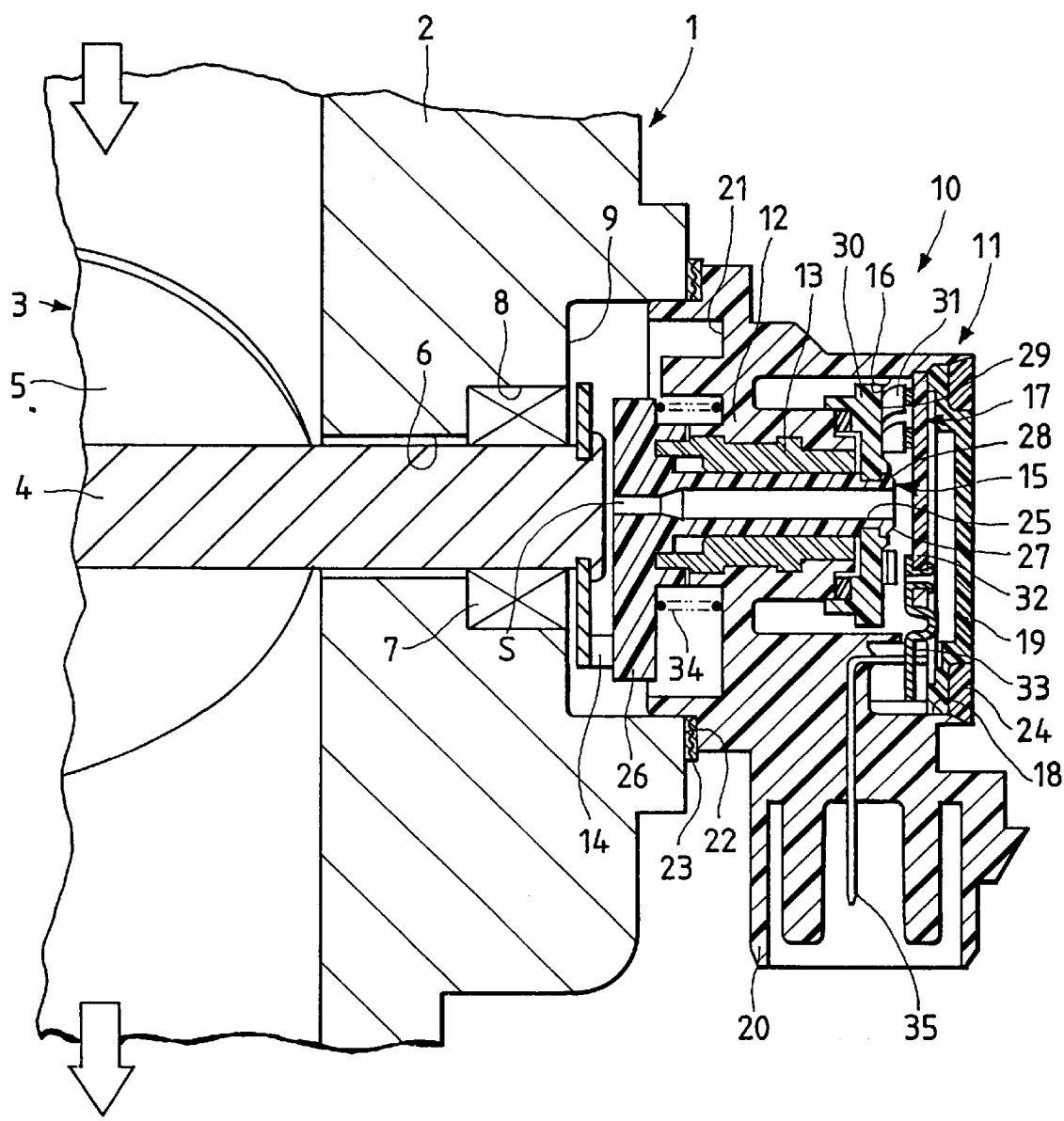
FIG. 1 is a sectional view of a throttle position sensor according to an embodiment of the present invention.

Referring first to FIG. 1, a throttle body 1 mounted on a vehicle comprises a cylindrical portion 2 disposed on the air intake side of an engine (not shown) and an operating portion 3 provided in the cylindrical portion 2. The operating portion 3 comprises a rotatable shaft 4 inserted in a direction to traverse the cylindrical portion 2 and adapted to rotate in proportion to the amount of operation of the accelerator pedal (not shown), and an opening/closing disc 5 which is integral with the rotatable shaft 5 to open and close the interior of the cylindrical portion 2. In the cylinder 4 is formed an insertion hole 6 for insertion therein of an end portion of the rotatable shaft 4. In an end portion of the insertion hole 6 is outwardly formed a large-diameter portion 8 in which is fitted a bearing 7. Outside the largediameter portion 8 is formed a recess 9. An end portion of the rotatable shaft 4 is projecting from the bottom of the recess 9, and the rotatable shaft 4 is supported rotatably by the bearing 7. In the throttle body 1 thus constructed, the opening/closing disc 5 in the operating portion 3 is opened or closed in proportion to the amount of operation of the accelerator pedal, whereby the amount of air to be fed to the engine through the interior of the cylindrical portion 2 is adjusted.

A throttle position sensor 10 as a position sensor according to this embodiment mainly comprises a housing 11 fixed to the cylindrical portion 2 of the device body, i.e., the throttle body 1, a bearing 13 fitted in a partition wall 12 within the housing 11, an operating shaft 15 which is supported rotatably by the bearing 13 and which is driven through a drive means 14 mounted to the end portion of the rotatable shaft 4, a sensor body 17 disposed within a receptacle chamber 16 formed in the housing 11, a cover 19 which covers an opening 18 of the receptacle chamber 16, and a connector portion 20 projecting downwards of the housing 11.

The housing 11 and the connector portion 20 are formed integrally using an insulating material such as a synthetic resin. The housing 11, on one end side thereof, has a mounting opening 21 to be mounted in a sealed state to the cylindrical portion 2, while on the opposite end side thereof are formed the foregoing receptacle chamber 16 and opening 18, with the partition wall 12 being formed between the mounting opening 21 and the receptacle chamber 16. A clearance is formed between a circumferential mounting surface 22 of the mounting opening 21 and the cylindrical portion 2. The clearance is sealed with a gasket 23. The opening 18 is covered with a cover 19, and a clearance formed between the opening 18 and the cover 19 is sealed with a thermoplastic resin 24 such as an epoxy resin for example.

The operating shaft 15 is disposed so that its axis is in alignment with the axis of the rotatable shaft 4 of the throttle body 1. A communication hole 25 for communication between the receptacle chamber 16 and the mounting opening 21 is formed centrally of the operating shaft 15. The communication hole 25 is tapered as a constriction S from the receptacle chamber 16 side toward the mounting opening 21. A projecting portion 26 for engagement with the drive means 14 is formed at the end portion of the operating shaft 15 on the side of the mounting opening 21, while at the end portion of the operating shaft 15 on the side of the receptacle chamber 16 are formed a stepped portion 27 and a caulking portion 28.

The sensor body 17 comprises a sliding-element receiver 30 connected to an end portion of the operating shaft 15 and having an insertion hole 29 for insertion therein of the operating shaft 15, an insulating substrate 32 disposed in close opposition to the sliding-element receiver 30 and having an electrically conductive pattern (not shown) for sliding contact with sliding elements 31 in the sliding-element receiver 30, and a signal line for outputting a signal from the electrically conductive pattern to the exterior. The edge portion of the insertion hole 29 is brought into abutment with the stepped portion 27 of the operating shaft 15 and in this state the caulking portion 28 is caulked, whereby the sliding-element receiver 30 is caulked and fixed to the end portion of the operating shaft 15. A coiled spring 34 is wound round one end portion of the operating shaft 15 on the mounting opening 21 side, whereby the operating shaft 15 and the slider receiver 30 are given a rotational bias in one direction.

A terminal 35 is connected to the signal line 33 and one end thereof is exposed to the interior of the connector portion 20. When an external connector (not shown) is inserted into the connector portion 20, the terminal 35 is brought into connection with a contact of the external connector.

In assembling the throttle position sensor constructed as above, the sensor body 17 is mounted from the opening 18 into the receptacle chamber 16 of the housing 11, then the opening 18 is covered with the cover 19, and the thermosetting resin 24 is filled into the clearance between the opening 18 and the cover 19 and is heated to cure the thermoplastic resin. At this time, the air expanded in the receptacle chamber 16 is allowed to escape to the exterior from the mounting opening 21 through the communication hole 25 formed in the operating shaft 15, so that the rise of pressure in the receptacle chamber 16 is prevented and hence there is no fear of pores or the like being formed in the thermosetting resin 24.

As shown in FIG. 1, the mounting surface 22 is brought into close contact with the cylindrical portion 2 of the throttle body 1 through the gasket 23 and in this state the throttle position sensor 10 thus assembled is mounted to the cylindrical portion 2 with bolts (not shown). In this mounted state, one end of the communication hole 25 formed in the operating shaft 15 is located in the mounting opening 21 which is in a sealed state with respect to the cylindrical portion 2 of the throttle body 1, so that there is no fear of entry of water, dust, etc. from the exterior into the receptacle chamber 16 through the communication hole 25. Thus, it is possible to surely prevent corrosion of the contact portion of the sensor body and the slider 31 which are disposed within the receptacle chamber 16.

In this embodiment constructed as above, since the entry of foreign matters such as water, dust, etc. into the receptacle chamber 16 of the housing 11 can be surely prevented and since the sensor body 17 disposed within the receptacle chamber 16 is isolated from foreign matters such as water, dust, etc., a high reliability of the throttle position sensor 10 is ensured. Further, the communication hole 25 is tapered from the receptacle chamber 16 toward the mounting opening 21, so even in the event a foreign matter should be present in the mounting opening 21, the foreign matter is difficult to get into the communication hole 25 from the mounting opening 21. On the other hand, the passing of air from the receptacle chamber 16 to the mounting opening 21 through the communication hole 25 is easy. The operating shaft 15 is in the form of a hollow pipe because the communication hole 25 is formed therethrough. Therefore, at the time of heat-caulking the operating shaft 15 and the sliding-element receiver 30, a small caulking load suffices because the wall thickness of the portion to be caulked is small. Besides, since the heat capacity of the heated portion is small, a short heating time suffices. Further, there is no thermal influence on the other portion other than the caulked portion because of a high heat conduction resistance. For these reasons, the caulking operation can be done in a simple and satisfactory manner.

According to this embodiment, moreover, since the communication hole 25 for communication between the receptacle chamber 16 and the mounting opening 21 is formed axially of the operating shaft 15, even if blow-by gas (combustion gas) enters the receptacle chamber 16 from the throttle body 1 side during engine stall for example, the blow-by gas stays below the mounting opening 21 because its specific gravity is larger than that of air. Thus, there is no fear of the blow-by gas reaching the interior of the receptacle chamber 16 directly through the communication hole 25.

Although in the embodiment illustrated in FIG. 1 the housing 11 is mounted to the throttle body 1 so that the connector portion 20 faces downward, the housing 11 may be attached to the throttle body 1 so that the connector portion 20 faces upward or sideways where required. Thus, a high design freedom is ensured. Also in this case the communication hole 25 always assumes a vertically middle position in the mounting opening 21, so that the blow-by gas stays below the mounting opening 21, with no fear of the blow-by gas entering the receptacle chamber 16 directly through the communication hole 25.

Figure 2:
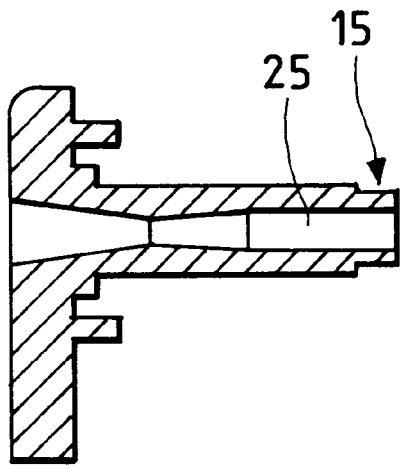
FIG. 2 is a sectional view showing a modified example of a communication hole.
Figure 3:
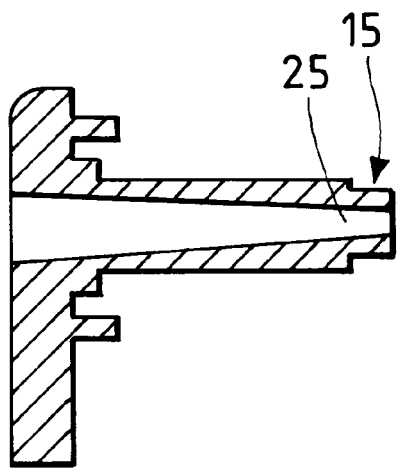
FIG. 3 is a sectional view showing another modified example of a communication hole.

FIGS. 2 and 3 show modified examples of communication holes 25. In the communication hole 25 shown in FIG. 2 is the narrowest in its interior portion and is divergent toward both receptacle chamber 16 and mounting opening 21. Since the communication hole 25 is formed by abutment of mold pins from both ends of the operating shaft, it is possible to ensure a satisfactory moldability in the case where the communication hole 25 is relatively long. Conversely, the communication hole 25 shown in FIG. 3 is tapered from the mounting opening 21 side toward the receptacle chamber 16 side. In both cases, the molding for formation of the communication holes 25 can be done with high mold extractability. In FIG. 3, the communication hole 25 may be tapered from the receptacle chamber 16 side toward the mounting opening 21 side.

Figure 4:
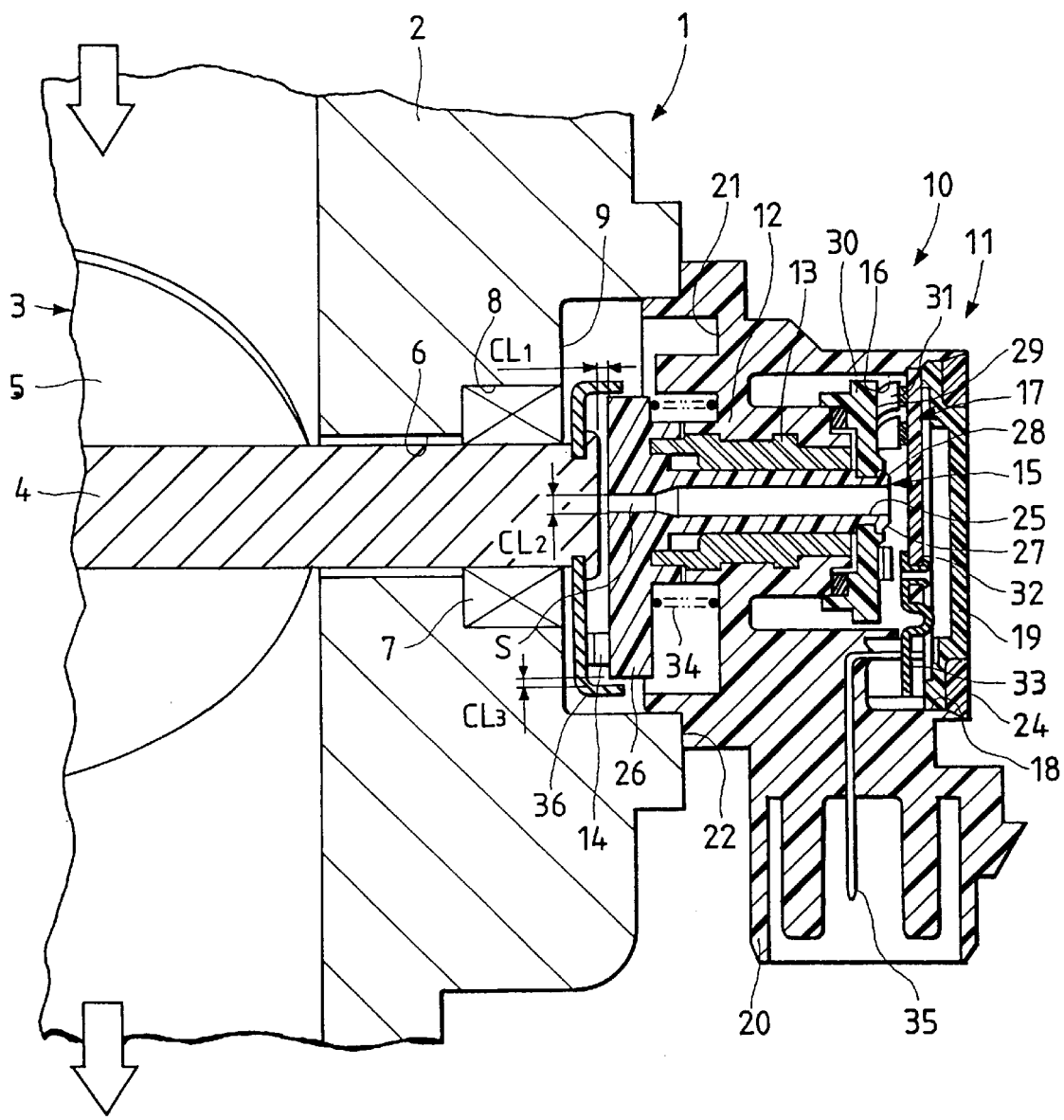
FIG. 4 is a sectional view of a throttle position sensor according to another embodiment of the present invention.

Referring now to FIG. 4, there is illustrated throttle position sensor according to another embodiment of the present invention. In this throttle position sensor, a cup-like cover 36 is provided at the end portion of the rotatable shaft 4. The cup-like cover 36 covers the projecting portion 26 of the operating shaft 15 from the outside and in proximity thereto. Further, a clearance $CL_1$ formed between the end face of the operating shaft 15 on the side of the projecting portion 26 side and the end face of the rotatable shaft 4 opposed thereto is set smaller than the section $CL_2$ of the constriction S of the communication hole 25 formed in the operating shaft 15, and a clearance $CL_3$ between the inside surface of the cover 36 and a side face of the projecting portion 26 is set smaller than the clearance $CL_1$. By so doing, even if the throttle position sensor 10 is attached directly to the cylindrical portion 2 without using the gasket 23 (a sealing member), the entry of a foreign matter into the receptacle chamber 16 can be surely prevented by virtue of a labyrinth effect based on the aforesaid setting of clearances $CL_1$, $CL_2$ and $CL_3$. It is possible to attain a sealing effect almost equal to that attained by the embodiment illustrated in FIG. 1.

According to the present invention, as set forth hereinabove, a communication hole for communication between the receptacle chamber and the mounting opening both formed in the housing is formed in the operating shaft, whereby the entry of foreign matters such as water and dust from the exterior into the receptacle chamber can be surely prevented and it is possible to provide a highly reliable position sensor.

Since the communication hole has a constriction which constricts the section of the communication hole, foreign matters are difficult to get into the communication hole from the mounting opening and thus also in this point it is possible to achieve the purpose of preventing the entry of foreign matters into the receptacle chamber. Besides, since the mounting opening side of the communication hole is made smaller in diameter than the other portion thereof and is wider than the clearance adjacent thereto, the entry of foreign matters into the receptacle chamber can be prevented by virtue of the resulting labyrinth effect. Further, during heating of the thermosetting resin, the air which was expanded in the receptacle chamber at the time of assembly of the position sensor can be allowed to escape to the exterior quickly and positively because it is easy to effect the passing of air from the receptacle chamber to the mounting opening through the communication hole.

What is claimed is:

1. A position sensor comprising:
    a housing having a mounting opening to be mounted to a device body for accommodating an operating portion which is to be detected by the position sensor through a partition wall and also having a receptacle chamber for receiving a position sensor body to be attached to said device body so as to make a dust-proof state in the chamber;
    an operating shaft supported rotatably by said partition wall;
    a sliding-element receiver connected to said operating shaft within said receptacle chamber;
    a sensor body having a sliding-element, an electrically conductive pattern slidably coming into contact therewith, and a sliding-element receiver for holding said sliding-element;
    an insulating substrate disposed in close opposition to said sliding-element receiver within said receptacle chamber;
    a cover for covering an opening of said receptacle chamber, said cover being sealed with a thermosetting resin; and
    a communication hole formed in said operating shaft so as to provide communication between said receptacle chamber and said mounting opening.

2. A position sensor according to claim 1, wherein said communication hole has a constriction.

3. A position sensor according to claim 2, wherein said constriction positioned on said mounting opening side of the communication hole is formed smaller in diameter than the receptacle chamber side of the communication hole.

4. A position sensor according to claim 2, wherein said constriction is positioned approximately at the middle of said communication hole.

5. A position sensor according to claim 2, wherein said constriction positioned on the receptacle chamber side of the communication hole is formed smaller in diameter than the other portion thereof.

6. A position sensor according to claim 2, wherein the communication hole portion positioned on the mounting side is formed wider than a clearance adjacent to the communication hole portion positioned on the mounting opening side.

7. A position sensor according to claim 6, wherein said clearance adjacent to the communication hole portion positioned on the mounting opening side is formed between an end portion of said operating shaft and an end portion of the to-be-detected portion opposed thereto.

8. A position sensor according to claim 7, wherein a cover member for covering the end portion of the operating shaft is attached to the end portion of the to-be-detected portion opposed to the end portion of said operating shaft, and a clearance is formed between the end portion of the operating shaft and said cover member, said clearance being set smaller than the clearance formed between the end portion of the operating shaft and the end portion of the to-be-detected portion opposed to the end portion of said operating shaft.

* * * * *